Patented Dec. 16, 1941

UNITED STATES PATENT OFFICE 2,266,021

DIESEL FUEL

Richard S. George, State College, Pa., and George S. Crandall, Edwin M. Nygaard, and Darwin E. Badertscher, Woodbury, N. J., assignor to Socony-Vacuum Oil Company, Incorporated, New York, N. Y., a corporation of New York No Drawing. Application June 4, 1940, Serial No. 338,738

14 Claims. (Cl. 44—9)

This invention has to do in a general way with the operation of internal combustion engines and is more particularly concerned with improving the operation of engines operating on the Diesel cycle by the incorporation in the Diesel fuel of a characterizing ingredient which will improve its ignition quality.

In engines operating on the Diesel cycle, where the fuel is injected into the compressed air in the cylinder and is ignited spontaneously, it is important that the delay period or lag between injection and ignition be short so as to promote the ease of starting and the smoothness of operation.

This invention has as its object the improvement of the ignition quality of a Diesel fuel by the admixture with the fuel of a compound possessing the property of accelerating the fuel ignition and is predicated upon the discovery that the ignition delay period can be substantially decreased by blending with the fuel a minor proportion of a thionitrite derived from a carbothiolic or a carbodithiolic acid.

The thionitrites derived from the carbothiolic acids are herein generally referred to as alkyl or aryl carbonyl thionitrites and have the general formula R.CO.SNO. Examples of these thionitrites which are typical of the compounds contemplated herein are propionyl thionitrite and benzoyl thionitrite. The thionitrites derived from carbodithiolic acids are herein broadly referred to as aryl and alkyl thiocarbonyl thionitrites and are typified by the general formula R.CS.SNO. Examples of the thiocarbonyl thionitrites are thiobenzoyl thionitrite and thiopropionyl thionitrite.

The general class of compounds contemplated herein may be represented by the formula R.CX.SNO, wherein R represents alkyl, alkaryl, aryl, and aralkyl radicals and X represents the element oxygen or sulfur.

The carbonyl and thiocarbonyl thionitries contemplated herein as Diesel fuel addition agents may be prepared in various ways, some of which are known to those skilled in the art. The preferred method of preparation, however, is that which is described in our copending application Serial No. 338,736, filed June 4, 1940, wherein the thio acid and an alkali nitrite are dissolved in a non-homogeneous liquid system, comprising an aqueous phase and a non-aqueous phase. The latter phase is a solvent for the thionitrite and possesses the further property of being substantially immiscible with water and miscible with Diesel fuel oil. The formation of the thionitrite is effected by adding to the reaction mixture described above a mineral acid which will react with the alkali nitrite to release nitrous acid, the nitrous acid reacting with the SH group of the thio acid to form the corresponding thionitrite. If desired, this procedure can also be carried out by employing the alkali salt of the thio acid, using a quantity of mineral acid in the reaction to convert the salt of the thio acid to the corresponding acid.

The thionitrite obtained according to the foregoing procedure or other suitable procedure can be blended with the Diesel fuel oil in the pure form, it may be formed in situ, or, preferably, with the procedure outlined above, it is obtained in solution in a solvent which is readily miscible with the Diesel fuel oil.

One procedure for preparing carbonyl and thiocarbonyl thionitrites is illustrated by the following example describing the details employed in the preparation of thiopropionyl thionitrite ($C_2H_5CS.SNO$) from dithiopropionic acid.

EXAMPLE

About 7 grams of dithiopropionic acid were dissolved in 900 grams of straight-run Diesel fuel oil and about 22 grams of fusel oil. The mixture was cooled to a temperature in the neighborhood of 0° C., and while maintaining this temperature there was added with constant stirring about 4.7 grams of sodium nitrite (97% $NaNO_2$) dissolved in about 25 grams of water. To the reaction mixture thus formed there was slowly added with constant stirring about 5.7 cc. of concentrated hydrochloric acid diluted with ice. The mixture was stirred vigorously for about ½ hour after the addition of the hydrochloric acid and thereafter the oil layer was separated from the aqueous layer and filtered, providing a Diesel fuel oil solution of thiopropionyl thionitrite. Other carbonyl and thiocarbonyl thionitrites were prepared following this same general procedure.

To demonstrate the effectiveness of the carbonyl and thiocarbonyl thionitrites contemplated herein as ignition accelerators for Diesel fuel, we have subjected various blends of representative compounds in Diesel fuel to the conventional test employed for determining cetane numbers, which test is indicative of the ignition quality of the fuel. The test involves comparison of the blended fuel with a standard reference fuel in a converted C. F. R. engine, using the ignition delay method. The cetane number (C. N.) is the per cent by volume of cetane in a blend of cetane and alpha methyl naphthalene having the same combustion characteristics as the sample under test. An increase in cetane number indicates an improvement of the combustion characteristics of the fuel blend.

In carrying out these tests, the results of which are tabulated in Table I below, two Diesel fuel oil stocks were employed, such stocks being indicated in the table as fuels A and B. These fuels were straight-run No. 2 fuel oil distillates, fuel A having a cetane number of 52 and fuel B having a cetane number of 56.5. In all instances the fuel blank contained in addition to the thionitrite addition agent a small quantity (from about 2 per cent to 5 per cent) of fusel oil which functioned as a stabilizer for the thionitrite, as disclosed in our copending application Serial No. 342,692, filed June 27, 1940, but which did not affect the ignition quality of a fuel blank containing the stabilizer alone. When a stabilizer, such as fusel oil, is used, the quantity thereof may vary from about 0.25 per cent to about 25 per cent, depending upon the nature of the blend, etc., smaller quantities in the neighborhood of from 2 per cent to 5 per cent being preferred.

*Table I*

| Fuel | Compound added | Concentrate | C. N. of blank | C. N. of blend | Increase in C. N. |
|---|---|---|---|---|---|
| | | Percent by weight | | | |
| A | Propionyl thionitrite. | 1.0 | 52.0 | 65.5 | 13.5 |
| A | Benzoyl thionitrite. | 1.0 | 52.0 | 58.0 | 6.0 |
| B | Thiopropionyl thionitrite. | 1.0 | 56.6 | 65.5+ | 9.0+ |
| B | Thiobenzoyl thionitrite. | 1.0 | 56.6 | 65.5+ | 9.0+ |

It will be seen from the foregoing table that the carbonyl and thiocarbonyl thionitrites are effective to substantially improve the ignition quality of a Diesel fuel when added thereto in minor proportions. The amount of the compound used may be varied depending upon the original base stock and the extent to which it is desired to improve the ignition quality for given operating conditions. In general it appears that the carbonyl and thiocarbonyl thionitrites may be used in amounts ranging from 0.1 per cent to 10 per cent to obtain the desired improvement in the ignition quality of the fuel, but the invention contemplates the addition of these compounds in amounts ranging from 0.25 per cent to 5.0 per cent.

It is to be understood that while we have herein described one preferred procedure for preparing the thionitrites and have given certain specific examples of the thio acids from which they may be obtained, the invention is not limited to the specific procedure nor the specific examples given but includes within its scope such changes and modifications as fairly come within the spirit of the appended claims.

We claim:

1. An improved Diesel fuel having in admixture therewith a minor proportion, sufficient to decrease the ignition delay period, of a compound having the general formula R.CX.SNO in which R represents a radical selected from the group consisting of alkyl, alkaryl, aryl, and aralkyl radicals and X is selected from the group consisting of oxygen and sulfur.

2. An improved Diesel fuel having in admixture therewith a minor proportion, from about 0.1 per cent to about 10.0 per cent, of a compound having the general formula R.CX.SNO in which R is selected from the group consisting of alkyl, alkaryl, aryl, and aralkyl radicals and X is selected from the group consisting of oxygen and sulfur.

3. An improved Diesel fuel having in admixture therewith a minor proportion, sufficient to decrease the ignition delay period thereof, of a carbonyl thionitrite.

4. An improved Diesel fuel having in admixture therewith a minor proportion, sufficient to decrease the ignition delay period thereof, of an alkyl carbonyl thionitrite.

5. An improved Diesel fuel having in admixture therewith a minor proportion, sufficient to decrease the ignition delay period thereof, of propionyl thionitrite.

6. An improved Diesel fuel having in admixture therewith a minor proportion, sufficient to decrease the ignition delay period thereof, of a thiocarbonyl thionitrite.

7. An improved Diesel fuel having in admixture therewith a minor proportion, sufficient to decrease the ignition delay period thereof, of an alkyl thiocarbonyl thionitrite.

8. An improved Diesel fuel having in admixture therewith a minor proportion, sufficient to decrease the ignition delay period thereof, of thiopropionyl thionitrite.

9. An improved Diesel fuel having in admixture therewith a minor proportion, sufficient to decrease the ignition delay period thereof, of an aryl thiocarbonyl thionitrite.

10. An improved Diesel fuel having in admixture therewith a minor proportion, sufficient to decrease the ignition delay period thereof, of thiobenzoyl thionitrite.

11. The method of accelerating the ignition of a liquid hydrocarbon fuel in an engine where the fuel is injected into compressed air in the engine cylinder and ignites spontaneously therein which comprises admixing with the fuel, prior to its injection into the cylinder, a minor proportion of a compound having the general formula R.CX.SNO wherein R is selected from the group consisting of alkyl, alkaryl, aryl, and aralkyl radicals and X is selected from the group consisting of sulfur and oxygen.

12. The method of accelerating the ignition of a liquid hydrocarbon fuel in an engine where the fuel is injected into compressed air in the engine cylinder and ignites spontaneously therein which comprises admixing with the fuel, prior to its injection into the cylinder, from about 0.1 per cent to about 10 per cent, of a compound having the general formula R.CX.SNO wherein R is selected from the group consisting of alkyl, alkaryl, aryl, and aralkyl radicals and X is selected from the group consisting of sulfur and oxygen.

13. An improved Diesel fuel comprising a hydrocarbon fuel oil and in admixture therewith a minor proportion, sufficient to decrease the ignition delay period of the fuel oil, of a thionitrite having the general formula R.CX.SNO in which R is selected from the group consisting of alkyl, alkaryl, aryl, and aralkyl radicals and X is selected from the group consisting of oxygen and sulfur, said fuel mixture also containing a minor proportion of fusel oil, sufficient to stabilize the thionitrite.

14. An improved Diesel fuel comprising a hydrocarbon fuel oil and in admixture therewith a minor proportion, from about 0.1 per cent to about 10.0 per cent, of a thionitrite having the general formula R.CX.SNO in which R is selected from the group consisting of alkyl, alkaryl, aryl and aralkyl radicals and X is selected from the group consisting of oxygen and sulfur, said fuel mixture also containing from about 0.25 per cent to about 25 per cent of fusel oil.

RICHARD S. GEORGE.
GEORGE S. CRANDALL.
EDWIN M. NYGAARD.
DARWIN E. BADERTSCHER.